United States Patent
Morita et al.

(10) Patent No.: US 9,701,098 B2
(45) Date of Patent: Jul. 11, 2017

(54) POLYETHYLENE-BASED RESIN FOAM SHEET

(71) Applicant: JSP CORPORATION, Tokyo (JP)

(72) Inventors: Kazuhiko Morita, Utsunomiya (JP); Hirotoshi Kakuta, Utsunomiya (JP); Ryuichi Taniguchi, Tochigi (JP)

(73) Assignee: JSP CORPORATION, Tokyo (JP)

( * ) Notice: Subject to any disclaimer, the term of this patent is extended or adjusted under 35 U.S.C. 154(b) by 234 days.

(21) Appl. No.: 14/425,135

(22) PCT Filed: Aug. 23, 2013

(86) PCT No.: PCT/JP2013/005001
§ 371 (c)(1),
(2) Date: Mar. 2, 2015

(87) PCT Pub. No.: WO2014/041750
PCT Pub. Date: Mar. 20, 2014

(65) Prior Publication Data
US 2015/0224745 A1    Aug. 13, 2015

(30) Foreign Application Priority Data
Sep. 12, 2012   (JP) ................. 2012-200394

(51) Int. Cl.
*B32B 27/06* (2006.01)
*B32B 27/32* (2006.01)
(Continued)

(52) U.S. Cl.
CPC .............. *B32B 27/065* (2013.01); *B32B 5/18* (2013.01); *B32B 27/06* (2013.01); *B32B 27/08* (2013.01);
(Continued)

(58) Field of Classification Search
CPC ......... B32B 27/18; B32B 27/08; B32B 27/32; B32B 27/065; B32B 27/06; B32B 5/18
See application file for complete search history.

(56) References Cited

U.S. PATENT DOCUMENTS

2004/0262802 A1* 12/2004 Morita .................... B29C 44/22
264/45.9

FOREIGN PATENT DOCUMENTS

| JP | 2004-181933 A | 7/2004 |
| JP | 2005-074771 A | 3/2005 |

(Continued)

OTHER PUBLICATIONS

Mar. 17, 2015 International Preliminary Report on Patentability issued in International Application No. PCT/JP2013/005001.
(Continued)

*Primary Examiner* — Prashant J Khatri
(74) *Attorney, Agent, or Firm* — Oliff PLC (57) ABSTRACT

A polyethylene-based resin foam sheet with density of 15 to 150 kg/m$^3$, including a foam layer containing, as a base resin, polyethylene-based resin, and antistatic layer which is lamination bonded to at least one side of the foam layer containing a polymeric antistatic agent and, as base resin, polyethylene-based resin, wherein polymeric antistatic agent melting point of 125 to 140° C. and ratio of its partial heat of fusion in a region above melting point to its total heat of fusion of 40% or lower, wherein antistatic layer contains the polymeric antistatic agent of 45 to 300 parts by mass based on 100 parts by mass of the polyethylene-based resin constituting the antistatic layer, wherein antistatic layer has a weight of 1 to 50 g/m$^2$, and antistatic layer shows initial electrostatic potential of 50 V or lower when a voltage of 10 kV is applied to a surface for 30 seconds.

4 Claims, 1 Drawing Sheet

(51) Int. Cl.
 *B32B 5/18* (2006.01)
 *B32B 27/18* (2006.01)
 *C08J 9/14* (2006.01)
 *B32B 27/08* (2006.01)

(52) U.S. Cl.
 CPC .............. *B32B 27/18* (2013.01); *B32B 27/32* (2013.01); *C08J 9/141* (2013.01); *B32B 2250/00* (2013.01); *B32B 2250/02* (2013.01); *B32B 2250/03* (2013.01); *B32B 2250/40* (2013.01); *B32B 2266/00* (2013.01); *B32B 2266/025* (2013.01); *B32B 2307/00* (2013.01); *B32B 2307/20* (2013.01); *B32B 2307/21* (2013.01); *B32B 2307/50* (2013.01); *B32B 2307/542* (2013.01); *B32B 2307/546* (2013.01); *B32B 2307/56* (2013.01); *B32B 2307/718* (2013.01); *B32B 2307/744* (2013.01); *B32B 2553/00* (2013.01); *C08J 2201/03* (2013.01); *C08J 2203/14* (2013.01); *C08J 2205/052* (2013.01); *C08J 2323/06* (2013.01)

(56) References Cited

FOREIGN PATENT DOCUMENTS

JP 2010-042598 A 2/2010
JP 2010-247529 A 11/2010

OTHER PUBLICATIONS

Nov. 19, 2013 International Search Report issued in International Patent Application No. PCT/JP2013/005001.

\* cited by examiner

POLYETHYLENE-BASED RESIN FOAM SHEET

TECHNICAL FIELD

The present invention relates to a polyethylene-based resin foam sheet.

This application is based on Japanese Patent Application No. 2012-200394, filed in Sep. 12, 2012, the entire disclosure of which is incorporated herein by reference and forms part of this specification.

BACKGROUND ART

Polyethylene-based resin foam sheets have been used as basic materials of cushioning materials, wrapping materials and others because they have moderate flexibility and cushioning property and are therefore unlikely to damage the articles wrapped therewith. In particular, a polyethylene-based resin foam sheet containing an antistatic agent and having a surface resistivity of approximately $1 \times 10^9$ to $1 \times 10^{13} \Omega$ has been used as a wrapping material for electric components or glass substrates that dislike dust or static electricity.

Conventionally, a surfactant, such as a glycerin fatty acid ester, has been used as an antistatic agent to be blended in polyolefin-based resins and so on. However, such a surfactant can bleed out from the foam sheet onto the article wrapped therewith and contaminate the article. Patent Document 1 discloses a foam sheet using a polymeric antistatic agent, instead of a surfactant, as an antistatic agent to reduce contamination of the surface of an item with which it contacts, such as the article wrapped therewith. Patent Document 2 discloses a polyolefin-based resin foam sheet including a foam layer, and a layer provided on at least one side of the foam layer and containing a polymeric antistatic agent as an antistatic agent. The polyolefin-based resin foam sheet can provide an antistatic effect without being significantly affected by the humidity conditions in the air and has flexibility and cushioning property.

RELATED ART DOCUMENT

Patent Document

Patent Document 1: JP-A-2004-181933
Patent Document 2: JP-A-2005-074771

SUMMARY OF THE INVENTION

Problem to be Solved by the Invention

With the recent improvement in performance of electric components and so on, the circuit wiring in electric components is becoming thinner and more susceptible to damage caused by static electricity. Thus, the demand for antistatic performance of wrapping materials is becoming increasingly high. In recent years, therefore, a wrapping material is in demand which has such an electric property that the resistance thereof is on the higher resistivity side of a conductive region and which is rarely or never electrostatically charged (hereinafter occasionally referred to as "electrostatic dissipative property").

The present inventors have attempted increasing the amount of antistatic agent added to the foam sheets described in Patent Documents 1 and 2 with a view toward obtaining a polyethylene-based resin foam sheet having an electrostatic dissipative property that provides an initial electrostatic potential of 50 V or lower when a surface thereof is applied with a voltage of 10 kV but could not obtain a foam sheet having the electrostatic dissipative property. Also, the present inventors have tried a polymeric antistatic agent having a lower electric resistivity but again could not obtain a foam sheet having the electrostatic dissipative property.

One known method for decreasing the surface resistivity of a wrapping material is to blend a conductive filler, such as conductive carbon black, in its base resin. However, as the antistatic performance required for the materials used to wrap electric components and so on, conductive performance is not necessarily required. On the contrary, when a wrapping material has too high an electric conductivity, a sudden discharge occurs when a charged electric component comes into contact with it and the resulting spontaneous large current may cause damage to circuits therein. In addition, with a method in which a conductive filler is blended, it is difficult to control the electric property within the electrostatic dissipative region because a slight increase or decrease in the blending amount of filler blended may cause a significant change in the surface resistivity.

The present invention has been made in view of the above problems, and it is, therefore, an object of the present invention to provide a polyethylene-based resin foam sheet having flexibility and cushioning property and having an electrostatic dissipative property.

Means for Solving the Problems

The gist of the present invention resides in the following (1) to (4).

(1) A polyethylene-based resin foam sheet with an apparent density of 15 to 150 kg/m³, comprising a foam layer which contains, as a base resin, a polyethylene-based resin containing a low-density polyethylene, and an antistatic layer which is lamination bonded to at least one side of the foam layer and contains a polymeric antistatic agent and, as a base resin, a polyethylene-based resin containing a low-density polyethylene, wherein the polymeric antistatic agent has a melting point of 125 to 140° C. and a ratio of its partial heat of fusion in a region above the melting point to its total heat of fusion of 40% or lower, wherein the antistatic layer contains the polymeric antistatic agent in an amount of 45 to 300 parts by mass based on 100 parts by mass of the polyethylene-based resin constituting the antistatic layer, wherein the antistatic layer has a basis weight of 1 to 50 g/m², and wherein the antistatic layer shows an initial electrostatic potential of 50 V or lower when a voltage of 10 kV is applied to a surface thereof for 30 seconds.

(2) The polyethylene-based resin foam sheet according to above (1), wherein the antistatic layer has a basis weight of 1 to 10 g/m².

(3) The polyethylene-based resin foam sheet according to above (1) or (2), wherein the polymeric antistatic agent has a melt viscosity ($\eta_{AS}$) at 190° C. and a shear rate of 100 sec$^{-1}$ of 100 to 600 Pa·s, and wherein a ratio ($\eta_{AS}/\eta_{PE}$) of the melt viscosity ($\eta_{AS}$) to the melt viscosity ($\eta_{PE}$) at 190° C. and a shear rate of 100 sec$^{-1}$ of the polyethylene-based resin constituting the antistatic layer is 0.4 to 1.0.

(4) The polyethylene-based resin foam sheet according to any one of above (1) to (3), wherein the polyethylene-based resin constituting the antistatic layer has a melt viscosity ($\eta_{PE}$) at 190° C. and a shear rate of 100 sec$^{-1}$ of 800 to 2,000 Pa·s.

Effect of the Invention

The polyethylene-based resin foam sheet of the present invention includes a foam layer and an antistatic layer. The antistatic layer contains a specific proportion of a polymeric antistatic agent that has a melting point of 125 to 140° C. and a ratio of the partial heat of fusion in a region above the melting point thereof to the total heat of fusion of 40% or lower, and shows an initial electrostatic potential of 50 V or lower when a voltage of 10 kV is applied to a surface thereof for 30 seconds. Thus, the polyethylene-based resin foam sheet of the present invention has flexibility and cushioning property and can be suitably used as a wrapping material for electronic components and so on.

DETAILED DESCRIPTION OF THE INVENTION

Description is hereinafter made of a polyethylene-based resin foam sheet according to the present invention.

The foam sheet according to the present invention is a polyethylene-based resin foam sheet with an apparent density of 15 to 150 kg/m$^3$, comprising a foam layer which contains, as a base resin, a polyethylene-based resin containing a low-density polyethylene, and an antistatic layer which is lamination bonded to at least one side of the foam layer and contains a polymeric antistatic agent and, as a base resin, a polyethylene-based resin containing a low-density polyethylene, wherein the polymeric antistatic agent has a melting point of 125 to 140° C. and a ratio of its partial heat of fusion in a region above the melting point to its total heat of fusion of 40% or lower, wherein the antistatic layer contains the polymeric antistatic agent in an amount of 45 to 300 parts by mass based on 100 parts by mass of the polyethylene-based resin constituting the antistatic layer, wherein the antistatic layer has a basis weight of 1 to 50 g/m$^2$, and wherein the antistatic layer shows an initial electrostatic potential of 50 V or lower when a voltage of 10 kV is applied to a surface thereof for 30 seconds.

Figure 1:
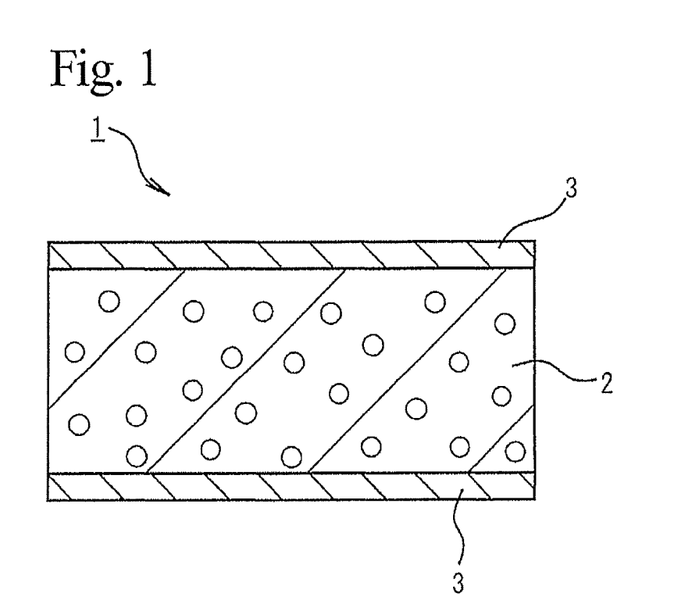
FIG. 1 is a cross-sectional view illustrating one example of a polyethylene-based resin foam sheet according to the present invention.

An example of the polyethylene-based resin foam sheet according to the present invention is shown in a cross-sectional view in FIG. 1. A polyethylene-based resin foam sheet 1 includes a foam layer 2 that contains a polyethylene-based resin as a base resin (hereinafter occasionally referred to as "foam layer"), and an antistatic layer 3 that is lamination bonded to at least one side of the foam layer 2 and contains a polymeric antistatic agent. While a polyethylene-based resin foam sheet 1 having an antistatic layer 3 laminated on both sides of the foam layer 2 is herein described primarily, the polyethylene-based resin foam sheet 1 may have an antistatic layer 3 laminated only on one side of the foam layer 2. Also, a polyethylene-based resin layer free of a polymeric antistatic agent may be laminated on the foam layer 2 with an antistatic layer 3 containing a polymeric antistatic agent being laminated on a surface of the polyethylene-based resin layer.

Figure 2:
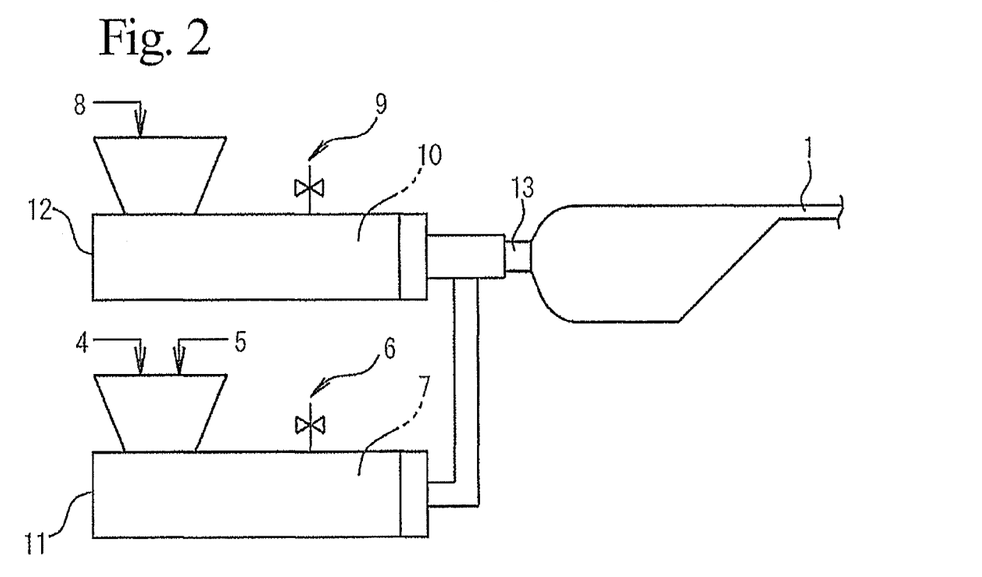
FIG. 2 is an explanatory view illustrating one example of a method for producing a polyethylene-based resin foam sheet according to the present invention.

The polyethylene-based resin foam sheet 1 according to the present invention can be produced by, for example, as shown in FIG. 2, obtaining a cylindrical laminated foam by laminating and coextruding, using a circular die 13, an antistatic layer-forming molten resin 7, that is prepared by supplying a polyethylene-based resin 4, a polymeric antistatic agent 5 and a volatile plasticizer 6 to a first extruder 11 and kneading the mixture therein, and a polyethylene-based resin foam layer-forming molten resin (hereinafter occasionally referred to as "foam layer-forming molten resin") 10, that is prepared by supplying a polyethylene-based resin 8 and a physical blowing agent 9 to a second extruder 12 and kneading the mixture therein, and then slitting the cylindrical laminated foam open from an end thereof. Besides the method described above, a method in which a flat die is used to coextrude the molten resins into a sheet-like form from the beginning may be employed.

Of the methods described above, the method that uses a circular die as a die 13 at the ends of the extruders is advantageous because formation of a wavy pattern called corrugate during extrusion foaming can be prevented and a broad foam sheet having a width of 1,000 mm or greater can be easily produced. In the coextrusion method, the resin layer and the foam layer may be laminated at the outlet of the circular die or outside the die outlet. As the circular die, the extruder, a cylindrical cooler, and the device for slitting the cylindrical laminated foam open, those conventionally known and used in the field of extrusion foaming may be used.

In the present invention, the polyethylene-based resin used to form the antistatic layer and the foam layer of the polyethylene-based resin foam sheet (hereinafter occasionally referred to as "foam sheet") is a resin containing 50 mol % or more of an ethylene component. Specific examples include low-density polyethylenes (PE-LD), linear low-density polyethylenes (PE-LLD), high-density polyethylenes (PE-HD), ethylene-vinyl acetate copolymers (EVAC), ethylene-methyl methacrylate copolymers (EMMA), and ethylene-ethyl acrylate (EEAK). In general, a high-density polyethylene is a polyethylene-based resin having a density of 940 kg/m$^3$ or higher. A low-density polyethylene is a polyethylene-based resin having a density of 910 kg/m$^3$ or higher and lower than 930 kg/m$^3$ and having a long-chain branched structure. A linear low-density polyethylene is a copolymer of ethylene and a $C_4$ to $C_8$ α-olefin and is a polyethylene-based resin having a density of 910 kg/m$^3$ or higher and lower than 940 kg/m$^3$ and having a substantially linear molecular chain.

The "polyethylene-based resin containing a low-density polyethylene" used to form the foam layer and the antistatic layer of the foam sheet according to the present invention means that the polyethylene-based resin contains a low-density polyethylene and, preferably, contains a low-density polyethylene as a primary component, from the standpoint of flexibility, i.e., in view of the fact that a low-density polyethylene can give a low surface hardness among polyethylene-based resins and can provide excellent surface protection to the article wrapped therewith. The term "contains a low-density polyethylene as a primary component" herein means that the polyethylene-based resin contains 50% by mass or more, preferably 70% by mass or more, more preferably 80% by mass or more, still more preferably 90% by mass or more, of a low-density polyethylene.

In general, a low-density polyethylene has a melting point of approximately 100 to 115° C. The extrusion temperature of the foam layer-forming molten resin must be adjusted in view of the desired apparent density of the foam layer, the type and amount of the blowing agent added, and so on. When a hydrocarbon compound, such as butane, is used as a blowing agent to obtain a foam layer having an apparent density of 15 to 150 kg/m$^3$, it is preferred that the foam layer-forming molten resin is adjusted to a temperature (foaming temperature) in the range of [melting point−10° C.] to [melting point+20° C.] of the low-density polyethylene before being supplied into the die and extruded therethrough. On the other hand, in order to form an antistatic layer without inhibiting the foaming of the foam layer by coextrusion, it is preferred to adjust the antistatic layer-forming molten resin to a temperature not higher than [the foaming temperature of the foam layer-forming molten resin+30° C.] before being supplied into the die and coextruded therethrough.

In order for the antistatic layer containing a polymeric antistatic agent to exhibit an electrostatic dissipative property, it is necessary not merely to increase the content of the polymeric antistatic agent but also to make the polymeric antistatic agent dispersed in a web or layer fashion in the polyethylene-based resin as a base resin of the antistatic layer so as to form a highly-conductive network.

Further, in order for the polymeric antistatic agent to form a conductive network in the antistatic layer in a manner sufficient to exhibit an electrostatic dissipative property, the melting point and distribution of heat of fusion of the polymeric antistatic agent and the content of the polymeric antistatic agent play an important role. Also important is to blend a volatile plasticizer into the antistatic layer-forming molten resin that is to be extruded and thereby to adjust the extrusion temperature of the antistatic layer-forming molten resin.

In order to obtain a foam layer having a low apparent density and a closed cell structure, it is first of all necessary that the resin temperature during extrusion foaming (foaming temperature) of the foam layer must be in a temperature range equal to or slightly higher than the melting point of the base resin thereof as described above. On the other hand, the resin temperature during extrusion of the antistatic layer-forming molten resin (the resin temperature during extrusion of a molten resin may be hereinafter occasionally referred to as "extrusion temperature") must be decreased to a temperature at which the foaming of the foam layer is not inhibited. Because the foam layer-forming molten resin has been plasticized by a physical blowing agent, it has fluidity necessary for extrusion even when cooled to a temperature close to its melting point. However, the antistatic layer-forming molten resin cannot be cooled to a temperature close to its melting point because it usually becomes significantly poor in fluidity. Thus, a volatile plasticizer is blended in the antistatic layer-forming molten resin to plasticize the molten resin. By this, the resin temperature of the molten resin can be reduced to a temperature at which the foaming of the foam layer is not inhibited. Additionally, it becomes possible to provide the antistatic layer with sufficient elongation. This means is effective especially when a foam layer having a low apparent density (high expansion ratio) is prepared and makes it possible to laminate an antistatic layer on the foam layer without causing a crack or rupture in the antistatic layer.

The volatile plasticizer hardly remains in the antistatic layer after the extrusion because it is mostly volatilized from the antistatic layer by the heat during the extrusion. Some of the volatile plasticizer occasionally remains in the antistatic layer immediately after the extrusion, but it is quickly volatilized and hardly remains in the antistatic layer.

As the volatile plasticizer, one kind or two or more kinds of hydrocarbon compounds selected from $C_2$ to $C_7$ aliphatic hydrocarbons, $C_1$ to $C_4$ aliphatic alcohols and $C_2$ to $C_8$ aliphatic ethers can be preferably used, and $C_3$ to $C_6$ aliphatic hydrocarbons can be especially preferably used. The use of hydrocarbon compounds as described above is preferred because they can efficiently plasticize the antistatic layer-forming molten resin.

Examples of the $C_2$ to $C_7$ aliphatic hydrocarbons include ethane, propane, normal butane, isobutane, normal pentane, isopentane, isohexane, cyclohexane and heptane, and, among these, the use of butane is preferred. More preferred is the use of isobutane, or a mixture of normal butane and isobutane with an isobutane content of 30 mol % or higher.

The volatile plasticizer is preferably added after the polymeric antistatic agent has been sufficiently dispersed in the polyethylene-based resin. When the polyethylene-based resin and the polymeric antistatic agent are kneaded together, formation of a conductive network structure can be ensured by maintaining the viscosity of the molten mixture at a relatively high level.

The polymeric antistatic agent must have a melting point of 125 to 140° C. and a ratio of the partial heat of fusion in a region above the melting point thereof to the total heat of fusion (hereinafter occasionally referred to as "ratio of partial heat of fusion") of 40% or lower.

It is believed that, by using a polymeric antistatic agent having a melting point and a ratio of partial heat of fusion in the above respective ranges, insufficient fusion of the polymeric antistatic agent and formation of crystallization products can be prevented when the antistatic layer is extruded at an extrusion temperature suitable to provide it with an electrostatic dissipative property, which is described later. As a consequence, a conductive network necessary to exhibit an electrostatic dissipative property is sufficiently formed.

When the ratio of partial heat of fusion is higher than 40%, in other words, when the polymeric antistatic agent contains a large amount of high-melting point components, the fluidity of the polymeric antistatic agent becomes so low during extrusion that a conductive network necessary to exhibit an electrostatic dissipative property cannot be formed sufficiently even when the polymeric antistatic agent has a melting point in the range of 125 to 140° C. From the standpoint of further increasing the fluidity at a low temperature and facilitating the formation of the conductive network, the ratio of partial heat of fusion is preferably 35% or lower.

In the present invention, the values obtained by the following methods are respectively employed as the melting point and the ratio of partial heat of fusion of the polymeric antistatic agent.

[Method for Measuring Melting Point]

The melting point is a value measured in accordance with the heat flux differential scanning calorimeter measurement based on JIS K7121 (1987). The conditions described in (2) Conditioning of Test Pieces are employed (except that the cooling rate is 10° C./min), and a test piece is heated from 40° C. at a rate of 10° C./min to obtain a DSC curve. The temperature at the top of the fusion peak on the obtained DSC curve is defined as the melting point. When two or more fusion peaks appear, the temperature at the top of the largest fusion peak is defined as the melting point.

[Method for Measuring Heat of Fusion]

The heat of fusion is a value measured in accordance with the heat flux differential scanning calorimeter measurement based on JIS K7122 (1987). The conditions described in (2) Conditioning of Test Pieces are employed (except that the cooling rate is 10° C./min), and a test piece is heated from at a rate of 10° C./min to obtain a DSC curve. From the total peak area of all the fusion peaks on the obtained DSC curve, the total amount of heat Ha (J/g) is obtained. In addition, a partial heat of fusion Hh (J/g) is obtained from the peak area of the fusion peak(s) above the melting point obtained as described above. The proportion of the partial heat of fusion Hh (J/g) based on the total amount of heat Ha (J/g) of all the fusion peaks is calculated according to calculation formula (1).

$$(Hh/Ha) \times 100 \qquad (1)$$

In the present invention, the content of the polymeric antistatic agent in the antistatic layer is 45 to 300 parts by mass based on 100 parts by mass of the polyethylene-based resin constituting the antistatic layer.

When the content of the polymeric antistatic agent is less than 45 parts by mass based on 100 parts by mass of the polyethylene-based resin, the conductive network is not formed sufficiently. When the content is greater than 300 parts by mass, on the other hand, the antistatic layer may have poor physical properties or the adhesion strength of the antistatic layer to the foam layer may be so poor that the antistatic layer may peel off easily from the foam layer, or, even worse, the formation of the antistatic layer by coextrusion per se may be difficult. From this point of view, the lower limit of the content is preferably 50 parts by mass, more preferably 60 parts by mass. On the other hand, the upper limit of the content is preferably 200 parts by mass, more preferably 150 parts by mass. To further ensure the formation of an antistatic layer that exhibits an electrostatic dissipative property, it is necessary to adjust the antistatic layer-forming molten resin in a temperature range equal to or higher than [the melting point of the polymeric antistatic agent−17.0° C.] before it is supplied into the coextrusion die and then coextruded together with the foam layer.

As described above, in a conventional method, the extrusion temperature of the antistatic layer-forming molten resin is decreased as much as possible from the standpoint of preventing the cellular structure in the foam layer from being broken. It has been found, however, that when the extrusion temperature of the antistatic layer-forming molten resin is lower than a specific temperature, the antistatic layer does not exhibit an electrostatic dissipative property. The reason for this is believed to be as follows. When the extrusion temperature is low, the viscosity of the polymeric antistatic agent increases rapidly during extrusion so that the melt viscosity of the polymeric antistatic agent becomes much higher than that of the polyethylene-based resin. Then, the polymeric antistatic agent cannot form a sufficient conductive network structure to exhibit an electrostatic dissipative property possibly because the polymeric antistatic agent is not sufficiently spread in the polyethylene-based resin even if it is present at a very high concentration as described above. In addition, it is believed that because the polyethylene-based resin, which has had a higher fluidity relative to the polymeric antistatic agent in the die, tends to be present more preferentially in regions close to the wall surfaces of the die due to a higher shear rate in the regions, the electric conductivity of the surface of the antistatic layer further decreases.

Thus, it is believed that because the antistatic layer-forming molten resin, which has been adjusted to a temperature range of [the melting point of the polymeric antistatic agent−17.0° C.] or higher before it is supplied into the coextrusion die, is coextruded together with the foam layer, the polymeric antistatic agent can form a sufficient conductive network structure in the antistatic layer. It is also believed that because a sufficient amount of polymeric antistatic agent is allowed to be present in the surface of the antistatic layer, an antistatic layer that exhibits an electrostatic dissipative property can be formed. From the standpoint of maintaining the closed cell content of the foam layer, the extrusion temperature of the antistatic layer-forming molten resin is preferably equal to or lower than the [foaming temperature+25° C.], more preferably equal to or lower than the [foaming temperature+20° C.], much more preferably equal to or lower than the [foaming temperature+17° C.], of the foam layer-forming molten resin.

The antistatic layer containing a polymeric antistatic agent has a basis weight of 1 to 50 g/m². The antistatic layer must have a basis weight of 1 g/m² or greater in order to exhibit an electrostatic dissipative property. When the basis weight of the antistatic layer is excessively large, the entire foam sheet tends to have poor flexibility and the cellular structure of the foam sheet is easily broken. From this point of view, the upper limit of the basis weight of the antistatic layer is 50 g/m², preferably 20 g/m², more preferably 10 g/m².

The polymeric antistatic agent is distinguished from low molecular weight antistatic agents such as surfactants, and specific examples thereof include hydrophilic polymers having a volume resistivity of $1 \times 10^5$ to $1 \times 10^{11}$ Ω·cm (hereinafter occasionally referred to simply as "hydrophilic polymers"), and block polymers composed of a hydrophilic polymer block and a hydrophobic polymer block. Examples of the hydrophilic polymers include polyethers, cationic polymers and anionic polymers. Examples of the hydrophobic polymer block include polyolefins and polyamides. Examples of the bond between a hydrophilic polymer block and a hydrophobic polymer block include an ester bond, an amide bond and an ether bond. Commercially available polymeric antistatic agents have a surface resistivity of approximately $1 \times 10^6$ to $1 \times 10^{10}$ Ω.

To prevent deterioration of physical properties of the antistatic layer which may be caused by the addition of an antistatic agent thereto, a polyolefin-based resin is preferably used as a hydrophobic polymer block to be copolymerized with a hydrophilic polymer block. In order for the polymeric antistatic agent to have a melting point and a ratio of partial heat of fusion as described above, the polymeric antistatic agent preferably contains a polyether as a hydrophilic polymer and contains no or little polyimide or amide bonds. Examples of the polymeric antistatic agent having a melting point and a ratio of partial heat of fusion as described above include "PELESTAT VL300" and "PELECTRON HS" manufactured by Sanyo Chemical Industries, Ltd., which are polyether-polyolefin block copolymers.

It is preferred that a ratio ($\eta_{AS}/\eta_{PE}$) of the melt viscosity ($\eta_{AS}$) of the polymeric antistatic agent to the melt viscosity ($\eta_{PE}$) of the polyethylene-based resin constituting the antistatic layer as measured at 190° C. and a shear rate of 100 sec$^{-1}$ is 0.4 to 1.0. When the ratio ($\eta_{AS}/\eta_{PE}$) is 0.4 to 1.0, the antistatic layer can exhibit an electrostatic dissipative property more stably since the polymeric antistatic agent can be easily dispersed in the form of stripes and a conductive network can be therefore established easily in the matrix of the polyethylene-based resin.

The polymeric antistatic agent preferably has a melt viscosity ($\eta_{AS}$), as measured at 190° C. and a shear rate of 100 sec$^{-1}$, of 100 to 600 Pa·s, more preferably 200 to 550 Pa·s. On the other hand, the polyethylene-based resin constituting the antistatic layer preferably has a melt viscosity ($\eta_{PE}$), as measured at 190° C. and a shear rate of 100 sec$^{-1}$, of 200 to 2,000 Pa·s, more preferably 400 to 2,000 Pa·s, much more preferably 800 to 2,000 Pa·s, most preferably 800 to 1,600 Pa·s.

The melt viscosities of the polyethylene-based resin and the polymeric antistatic agent can be measured with, for example, a measurement instrument, such as Capilograph 1D manufactured by Toyo Seiki Seisaku-sho, Ltd. Specifically, a cylinder with a cylinder diameter of 9.55 mm and a length of 350 mm and an orifice with a nozzle diameter of 1.0 mm and a length of 10 mm are used, and the temperature of the cylinder and orifice is set to 190° C. Approximately 15 g of a measurement sample is placed in the cylinder and allowed to stand for 5 minutes. Then, the molten resin is extruded through the orifice in the form of a strand at a shear rate of 100 $sec^{-1}$, and the melt viscosity of the molten resin is measured at this time.

To satisfy the melt viscosity as described above, the polymeric antistatic agent preferably has a number average molecular weight of 2,000 to 100,000, more preferably 5,000 to 60,000, much more preferably 10,000 to 40,000. The number average molecular weight is a number average molecular weight converted using a calibration curve obtained by a gel permeation chromatography using a polystyrene having a known molecular weight (number average molecular weight expressed in terms of polystyrene).

In order to improve the slippage of the antistatic layer, a linear low-density polyethylene or high-density polyethylene may be blended in the polyethylene-based resin. In this case, the linear low-density polyethylene or high-density polyethylene is preferably blended in such an amount that the content thereof in the polyethylene-based resin is 5 to 30% by mass, more preferably 10 to 20% by mass.

Various additives may be added to the antistatic layer to the extent that the object of the present invention is not impaired. Examples of the various additives include an antioxidant, a thermal stabilizer, a weather-resisting agent, a UV absorber, a flame retardant, a filler and an antibacterial agent. These additives are preferably added in an amount of 10 parts by mass or less, more preferably 5 parts by mass or less, especially preferably 3 parts by mass or less, based on 100 parts by mass of the total of the polyethylene-based resin and the polymeric antistatic agent constituting the antistatic layer.

A thermoplastic resin other than a polyethylene-based resin, such as a polystyrene-based resin or polypropylene-based resin, and/or an elastomer, such as an olefinic elastomer, styrenic elastomer or ethylene propylene rubber, may be added to the foam layer to the extent that the object and effect of the present invention are not impaired. In this case, these additives are preferably added in an amount of 40 parts by mass or less, more preferably 25 parts by mass or less, especially preferably 10 parts by mass, based on 100 parts by mass of the polyethylene-based resin constituting the foam layer.

Various additives may be added to the foam layer. Examples of the various additives include a nucleating agent, an antioxidant, a thermal stabilizer, a weather-resisting agent, a UV absorber, a flame retardant, an inorganic filler, an antibacterial agent and an anti-shrinking agent. These additives are preferably added in an amount of 10 parts by mass or less, more preferably 5 parts by mass or less, especially preferably 3 parts by mass or less, based on 100 parts by mass of the polyethylene-based resin constituting the foam layer.

Examples of the blowing agent used to produce the foam layer of the present invention include organic physical blowing agents such as aliphatic hydrocarbons including propane, normal butane, isobutane, normal pentane, isopentane, normal hexane, isohexane and cyclohexane, and chlorohydrocarbons including methyl chloride and ethyl chloride, and inorganic physical blowing agents including nitrogen and carbon dioxide. These physical blowing agents may be used in combination of two or more kinds.

The amount of the blowing agent added is adjusted as appropriate based on the type of the blowing agent and the intended apparent density of the foam layer. For example, when an organic physical blowing agent, such as butane, is used, the organic physical blowing agent is preferably added in an amount of 3 to 30 parts by mass, more preferably 4 to 20 parts by mass, based on 100 parts by mass of the polyethylene-based resin as a base resin.

A cell controlling agent is usually added to the foam layer-forming molten resin. Examples of the cell controlling agent include metal borates such as zinc borate, magnesium borate and borax, sodium chloride, aluminum hydroxide, talc, zeolite, silica, calcium carbonate, sodium bicarbonate, sodium 2,2'-methylenebis-(4,6-tert-butylphenyl)phosphate, sodium benzoate, calcium benzoate, aluminum benzoate and sodium stearate. A combination of citric acid and sodium bicarbonate and a combination of a monoalkali salt of citric acid and sodium bicarbonate can be also used as a cell controlling agent. These cell controlling agents may be used in combination of two or more kinds.

The foam sheet of the present invention preferably has a thickness of 0.03 to 10 mm so that the foam sheet can have excellent cushioning property when used as a wrapping sheet and can be easy to handle when articles are wrapped therewith. From this point of view, the foam sheet more preferably has a thickness of 8 mm or less. On the other hand, when the foam sheet is used in any application that requires especially high cushioning property, the thickness is more preferably 0.05 mm or greater, much more preferably 0.1 mm or greater, especially preferably 0.2 mm or greater, most preferably 0.3 mm or greater.

In the present invention, the thickness of the foam sheet is measured by the following method. First, the foam sheet is cut in a direction perpendicular to the extrusion direction thereof, and the cross-section is photographed at equally-spaced ten points along the width of the foam sheet under a microscope. Then, the thickness of the foam sheet and the thickness of the antistatic layer at each photographed point are measured, and the arithmetic mean values of the obtained values are defined as the thickness of the foam sheet and the thickness of the antistatic layer. Next, the thickness of the antistatic layer is subtracted from the thickness of the foam sheet, and the thickness obtained as a result of the subtraction is defined as the thickness of the foam layer. Either the foam layer or antistatic layer may be dyed so that the thickness of the foam layer or thickness of the antistatic layer can be measured easily. The thicknesses of the foam layer and the thickness of the antistatic layer are adjusted to the above-mentioned respective ranges by adjusting the discharge rate and the drawing rate thereof.

The foam sheet of the present invention has an apparent density of 15 to 150 $kg/m^3$. When the apparent density is lower than 15 $kg/m^3$, the foam sheet may be insufficient in strength as a wrapping material. From this point of view, the foam sheet preferably has an apparent density of 18 $kg/m^3$ or higher, more preferably 20 $kg/m^3$ or higher. On the other hand, when the apparent density of the foam sheet is higher than 150 $kg/m^3$, the cushioning property of the foam sheet may be insufficient depending on its application. From this point of view, the foam sheet preferably has an apparent density of 60 $kg/m^3$ or lower, more preferably 55 $kg/m^3$ or lower, much more preferably 45 kg/m$^3$ or lower, especially preferably 40 kg/m$^3$ or lower.

In the present invention, the apparent density of the foam sheet is measured by the following method. First, the basis weight of the foam sheet is measured. The basis weight (g/m$^2$) of the foam sheet is obtained by cutting a test piece, extending across the entire width of the foam sheet and having a length of 10 cm, from the foam sheet, measuring the mass (g) of the test piece, and then dividing the mass by the area (m$^2$: the width of the sheet (m)×0.1 m) of the test piece. The value obtained by dividing the basis weight (g/m$^2$) of the foam sheet by the thickness of the foam sheet (mm) is subjected to unit conversion to obtain the apparent density (kg/m$^3$) of the foam sheet.

The basis weight (g/m$^2$) of the antistatic layer can be obtained by multiplying the thickness of the antistatic layer obtained by the above thickness measurement method by the density of the resin constituting the antistatic layer and subjecting the resulting value to unit conversion. When the interface between the foam layer and the antistatic agent is not clear, the basis weight [g/m$^2$] of the antistatic layer can be obtained, according to the equation (2) below, from the discharge rate X [kg/hr] of the antistatic layer, the width W [m] of the obtained foam sheet and the length L per unit time [m/hr] of the foam sheet, which are obtained during the production of the foam sheet. When an antistatic layer is laminated on both sides of the foam layer, the basis weights of respective antistatic layers are obtained from the discharge rates of respective antistatic layers.

$$\text{Basis weight of antistatic layer } [g/m^2]=1000\times/(L\times W) \qquad (2)$$

In the foam sheet shown in FIG. 1, the foam layer is preferably formed to have a closed cell content of 20% or higher, more preferably 30% or higher, much more preferably 35% or higher, so that the foam sheet can have cushioning property. The closed cell content S (%) of the foam layer is the value calculated according to the equation (3) below from the solid volume Vx (cm$^3$) (sum of the volume of closed cells and the volume of the resin portion) of the foam sheet measured using an air-comparison type specific gravity meter, Model 930, manufactured by Toshiba Beckman Inc. in accordance with the procedure C of ASTM D2856-70.

$$S\ (\%)=(Vx-W/\rho)\times 100/(Va-W/\rho) \qquad (3)$$

In the equation (3), Va, W and ρ are as follows.
Va: The apparent volume (cm$^3$) of the foam sheet used for measurement.
W: The mass (g) of the foam sheet of the test piece.
ρ: The density (g/cm$^3$) of the resin constituting the foam sheet.

The antistatic layer of the foam sheet according to the present invention shows an initial electrostatic potential of 50 V or lower, preferably 30 V or lower, most preferably 0 V, when a voltage of 10 kV is applied to a surface thereof for 30 seconds.

In the present invention, the initial electrostatic potential is measured as follows. First, a plurality of test pieces, each having a size of 40 mm×40 mm and a thickness equal to the thickness of the laminate sheet is cut out from the foam sheet, and the test pieces are subjected to conditioning in a 23° C. and 50% RH environment for 24 hours. Then, a voltage of 10 kV is applied to a surface of the antistatic layer of each test piece in accordance with the method A of JIS L1094 (1988) in a 23° C. and 50% RH environment, and the initial electrostatic potential is measured when the application is stopped. Then, the average of the measurement values is defined as the initial electrostatic potential. As the measurement instrument, Static Honestmeter (Model: TIPE S-5109) manufactured by Shishido Electrostatic, Ltd., for example, can be used.

The foam sheet of the present invention preferably has a surface resistivity of $1.0\times10^{10}$ (Ω) or lower, more preferably $7.0\times10^9$ (Ω) or lower, much more preferably $5.0\times10^9$ (Ω) or lower. From the standpoint of preventing the foam sheet from having excessive quality, the surface resistivity of the foam sheet is preferably $1.0\times10^7$ (Ω) or higher. The method for measuring the surface resistivity is described below.

[Measurement of Surface Resistivity]

From the sheet, a plurality of test pieces, each having a length of 100 mm, a width of 100 mm and a thickness equal to the sheet thickness are cut out. Then, in accordance with the method of JIS K6271 (2001), a voltage of 500 V is applied to the test pieces and the surface resistance value is measured one minute after the application. The surface resistivity can be obtained from the average of the obtained measurement values. The surface resistivity of the polymeric antistatic agent can be also obtained by measuring the surface resistance values one minute after the application of a voltage of 500 V based on the method of JIS K6271 (2001) and calculating the average of the obtained measurement values. As the measurement instrument, Model TR8601, manufactured by Takeda Riken Industry Co., Ltd., for example, can be used.

EXAMPLES

The present invention is described below in detail by way of examples and comparative examples.

The polyethylene-based resins, polymeric antistatic agents and cell controlling agents as raw materials, and evaluation methods used in the examples and comparative examples are as follows.
(1) Raw Materials
(a) Polyethylene-Based Resins
(i) Low-Density Polyethylene (Hereinafter Occasionally Referred to as Low-Density Polyethylene LD1)
Low-density polyethylene manufactured by The Dow Chemical Company (trade name: NUC8321, density: 922 kg/m$^3$, melt viscosity: 820 Pa's, melting point: 111.1° C.)
(ii) Low-Density Polyethylene (Hereinafter Occasionally Referred to as Low-Density Polyethylene LD2)
Low-density polyethylene manufactured by The Dow Chemical Company (trade name: NUC8008, density: 918 kg/m$^3$, melt viscosity: 600 Pa·s, melting point: 107.3° C.)
(iii) Low-Density Polyethylene (Hereinafter Occasionally Referred to as Low-Density Polyethylene LD3)
Low-density polyethylene manufactured by The Dow Chemical Company (trade name: DNDV-0405R, density: 914 kg/m$^3$, melt viscosity: 200 Pa·s, melting point: 104.8° C.)
(iv) Low-Density Polyethylene (Hereinafter Occasionally Referred to as Low-Density Polyethylene LD4)
Low-density polyethylene manufactured by Sumitomo Chemical Co., Ltd. (trade name: F102, density: 914 kg/m$^3$, melt viscosity: 1,520 Pa·s, melting point: 108.7° C.)
(b) Polymeric Antistatic Agents
(i) Polymeric Antistatic Agent (HS)
Polyether-polyolefin block copolymer manufactured by Sanyo Chemical Industries, Ltd. (trade name: PELECTRON HS, melt viscosity: 490 Pa·s, melting point: 133.7° C., ratio of partial heat of fusion: 33%, surface resistivity: $2.0\times10^6$ Ω)

(ii) Polymeric antistatic agent (VL300)

Polyether-polyolefin block copolymer manufactured by Sanyo Chemical Industries, Ltd. (trade name: PELESTAT VL300, melt viscosity: 230 Pa·s, melting point: 133.3° C., ratio of partial heat of fusion: 30%, surface resistivity: $1.0 \times 10^8 \Omega$), (iii) Polymeric Antistatic Agent (PVH)

Polyether-polyolefin block copolymer manufactured by Sanyo Chemical Industries, Ltd. (trade name: PELECTRON PVH, melt viscosity: 470 Pa·s, melting point: 131.4° C., ratio of partial heat of fusion: 48%, surface resistivity: $8.4 \times 10^6 \Omega$)

(iv) Polymeric Antistatic Agent (HC250)

Polyether-polyolefin block copolymer manufactured by Sanyo Chemical Industries, Ltd. (trade name: PELESTAT HC250, melt viscosity: 250 Pa·s, melting point: 134.8° C., ratio of partial heat of fusion: 51%, surface resistivity: $2.8 \times 10^7 \Omega$)

(c) Cell Controlling Agent

Cell controlling agent master batch manufactured by Dainichiseika Color & Chemicals Mfg. Co., Ltd. (trade name: PO217K)

(2) Evaluation Methods (2-1) Methods for Measuring Melting Point and Heat of Fusion The melting point and heat of fusion were measured by the above-mentioned methods, which are in accordance with JIS K7121 (1987) and JIS K7122 (1987), respectively.

(2-2) Methods for Evaluating Foam Sheet (a) Thickness, Apparent Density and Basis Weight The thickness, apparent density and basis weight of the foam sheet were measured by the above-mentioned methods. The basis weight of the antistatic layer was obtained from the discharge rate of the antistatic layer as described above.

(b) Surface Resistivity

Three test pieces were randomly cut out from the foam sheet, and the surface resistivity of each test piece was measured by a method in accordance with JIS K6271 (2001) as described above. The surface resistivity was obtained from the average of the obtained measurement values. As the measurement instrument, Model TR8601, manufactured by Takeda Riken Industry Co., Ltd., was used (c) Initial Electrostatic Potential The initial electrostatic potential was measured as follows. Three test pieces were randomly cut out from the foam sheet, and the initial electrostatic potential of each test piece was measured in accordance with the method A of JIS L1094 (1988). The average of the measurement values was employed as the initial electrostatic potential. As the measurement instrument, Static Honestmeter (Model: TIPE S-5109), manufactured by Shishido Electrostatic, Ltd., was used.

(d) Closed Cell Content

A test piece was cut out of the foam sheet at randomly-selected three locations, and the closed cell content of each test piece was measured by a method in accordance with ASTM D2856-70 as described above. The average of the measurement values was employed as the closed cell content.

Example 1

A tandem extruder including two extruders having a diameter of 90 mm and a diameter 120 mm, respectively, was used as the extruder for use in forming a foam layer, and an extruder having a diameter of 50 mm with L/D=50 was used as the extruder for use in forming an antistatic layer containing a polymeric antistatic agent. A circular die having a diameter of 95 mm was used for coextrusion of a foam sheet.

To form a foam layer, the low-density polyethylene LD1 and the cell controlling agent master batch in an amount of 0.3 parts by mass based on 100 parts by mass of the low-density polyethylene were supplied to the extruder with a diameter of 90 mm, and heated and kneaded therein to form a molten mixture adjusted to approximately 200° C. A butane-mixed blowing agent consisting of 70% by mass of normal butane and 30% by mass of isobutene was added under pressure as a physical blowing agent to the molten mixture in an amount of 11 parts by mass based on 100 parts by mass of the low-density polyethylene, and the mixture was supplied to the extruder with a diameter of 120 mm connected downstream of the extruder with a diameter of 90 mm to obtain a foam layer-forming molten resin at 112° C.

To form an antistatic layer, the low-density polyethylene LD1 and the polymeric antistatic agent HS in an amount of 100 parts by mass based on 100 parts by mass of the low-density polyethylene were supplied to the extruder with a diameter of 50 mm, and heated and melted therein to form a molten resin mixture adjusted to approximately 200° C. A mixture consisting of 70% by mass of normal butane and 30% by mass of isobutene (referred to simply as "butane" in Table 1) was added under pressure to the molten resin mixture as a volatile plasticizer in an amount of 11 parts by mass based on 100 parts by mass of the molten mixture of the low-density polyethylene and the polymeric antistatic agent. Then, the temperature of the molten resin was adjusted to 117° C. to obtain an antistatic layer-forming molten resin containing a polymeric antistatic agent.

The obtained antistatic layer-forming molten resin and foam layer-forming molten resin were supplied into a combining die. Then, the molten resins were laminated and combined such that the antistatic layer-forming molten resin could form face and back layers of the foam layer (outer and inner layers of the resulting cylindrical laminated foam) and coextruded from the circular die to form a cylindrical laminated foam having three-layer configuration consisting of an antistatic layer, a polyethylene-based resin foam layer and an antistatic layer laminated in this order from the exterior side. Then, the cylindrical laminated foam was slitted open in the extrusion direction while it is drawn over a cooled cylinder to obtain an intended foam sheet. The drawing rate was adjusted such that the foam sheet had a thickness of 1 mm.

Example 2

A foam sheet was obtained in the same manner as in Example 1 except that the rate at which the coextruded cylindrical laminated foam was drawn from the circular die over a cooled cylinder was adjusted such that the foam sheet had a thickness of 2 mm.

Example 3

A foam sheet was obtained in the same manner as in Example 1 except that the butane mixture consisting of 70% by mass of normal butane and 30% by mass of isobutene as a physical blowing agent was added in an amount of 17.6 parts by mass based on 100 parts by mass of the low-density polyethylene and the volatile plasticizer consisting of 70% by mass normal butane and 30% by mass of isobutene was added in an amount of 17.6 parts by mass based on 100 parts by mass of the molten mixture of the low-density polyethylene and the polymeric antistatic agent.

Example 4

A foam sheet was obtained in the same manner as in Example 1 except that the polymeric antistatic agent was added in an amount of 45 parts by mass based on 100 parts by mass of the low-density polyethylene and the ratio between the discharge rate of the antistatic layer-forming molten resin and the discharge rate of the foam layer-forming molten resin was adjusted so that lamination amounts thereof were as shown in the table.

Example 5

A foam sheet was obtained in the same manner as in Example 1 except that the temperature of the antistatic layer-forming molten resin was adjusted to 120° C. before it was introduced into the combining die.

Example 6

A foam sheet was obtained in the same manner as in Example 1 except that the low-density polyethylene LD3 was used as the base resin of the antistatic layer.

Example 7

A foam sheet was obtained in the same manner as in Example 1 except that the polymeric antistatic agent VL300 was added to the antistatic layer-forming molten resin in an amount of 100 parts by mass based on 100 parts by mass of the low-density polyethylene LD1.

Example 8

A foam sheet was obtained in the same manner as in Example 1 except that the low-density polyethylene LD2 was used as the base resin of the antistatic layer.

Example 9

A foam sheet was obtained in the same manner as in Example 1 except that the low-density polyethylene LD4 was used as the base resin of the antistatic layer.

Example 10

A foam sheet was obtained in the same manner as in Example 1 except that the extrusion temperature of the antistatic layer-forming molten resin was adjusted to 140° C.

Comparative Example 1

A foam sheet was obtained in the same manner as in Example 1 except that the polymeric antistatic agent PVH was added in an amount of 100 parts by mass based on 100 parts by mass of the low-density polyethylene LD1, that the antistatic layer-forming molten resin was kneaded after 11.0 parts by mass of a mixture consisting of 70% by mass of normal butane and 30% by mass of isobutene was added thereto as a volatile plasticizer, and that the extrusion temperature of the antistatic layer-forming molten resin was adjusted to 120° C. The obtained foam sheet had a surface resistivity of $3.8 \times 10^{10} \Omega$ and an initial electrostatic potential of 500 V.

Comparative Example 2

A foam sheet was obtained in the same manner as in Comparative Example 1 except that the low-density polyethylene LD2 was used as the base resin of the antistatic layer-forming molten resin and the extrusion temperature of the antistatic layer-forming molten resin was adjusted to 117° C. The obtained foam sheet had a surface resistivity of $1.7 \times 10^{11} \Omega$ and an initial electrostatic potential of 1,200 V.

Comparative Example 3

A foam sheet was obtained in the same manner as in Comparative Example 2 except that the polymeric antistatic agent HC250 was added to the antistatic layer-forming molten resin in an amount of 100 parts by mass based on 100 parts by mass of the low-density polyethylene LD2. The obtained foam sheet had a surface resistivity of $1.1 \times 10^{14} \Omega$ and an initial electrostatic potential of at least 2,400 V.

Comparative Example 4

A foam sheet was obtained in the same manner as in Example 1 except that the extrusion temperature of the antistatic layer-forming molten resin was adjusted to 112° C. The obtained foam sheet had a surface resistivity of $1.3 \times 10^{11} \Omega$ and a saturated electrostatic potential of 1,300 V.

Comparative Example 5

A foam sheet was obtained in the same manner as in Example 1 except that the polymeric antistatic agent was added in an amount of 25 parts by mass.

The obtained foam sheet had a surface resistivity of $3.7 \times 10^{10} \Omega$ and an initial electrostatic potential of 580 V. The evaluation results and so on are summarized in Tables 1 and 2.

TABLE 1

| | Conditions under which antistatic layer is formed | | | | | | |
|---|---|---|---|---|---|---|---|
| | Polyethylene-based resin | | | Polymeric antistatic agent | | | |
| | Type — | Melt viscosity $\eta_{PE}$ Pa·s | Melting point ° C. | Type — | Melt viscosity $\eta_{AS}$ Pa·s | Melt viscosity ratio $\eta_{AS}/\eta_{PE}$ — | Melting point ° C. |
| Ex. 1 | LD1 | 820 | 111.1 | HS | 490 | 0.6 | 133.7 |
| Ex. 2 | LD1 | 820 | 111.1 | HS | 490 | 0.6 | 133.7 |
| Ex. 3 | LD1 | 820 | 111.1 | HS | 490 | 0.6 | 133.7 |
| Ex. 4 | LD1 | 820 | 111.1 | HS | 490 | 0.6 | 133.7 |
| Ex. 5 | LD1 | 820 | 111.1 | HS | 490 | 0.6 | 133.7 |
| Ex. 6 | LD3 | 200 | 104.8 | HS | 490 | 2.5 | 133.7 |
| Ex. 7 | LD1 | 820 | 111.1 | VL300 | 230 | 0.3 | 133.3 |

TABLE 1-continued

Conditions under which antistatic layer is formed

|  |  |  |  |  |  |  |  |
|---|---|---|---|---|---|---|---|
| Ex. 8 | LD2 | 600 | 107.3 | HS | 490 | 0.8 | 133.7 |
| Ex. 9 | LD4 | 1520 | 108.7 | HS | 490 | 0.3 | 133.7 |
| Ex. 10 | LD1 | 820 | 111.1 | HS | 490 | 0.6 | 133.7 |
| Comp. Ex. 1 | LD1 | 820 | 111.1 | PVH | 470 | 0.6 | 131.4 |
| Comp. Ex. 2 | LD2 | 600 | 107.3 | PVH | 470 | 0.8 | 131.4 |
| Comp. Ex. 3 | LD2 | 600 | 107.3 | HC250 | 250 | 0.4 | 134.8 |
| Comp. Ex. 4 | LD1 | 820 | 111.1 | VL300 | 230 | 0.3 | 133.3 |
| Comp. Ex. 5 | LD1 | 820 | 111.1 | HS | 490 | 0.6 | 133.7 |

| | Polymeric antistatic agent | | | | Volatile plasticizer | | | |
|---|---|---|---|---|---|---|---|---|
| | Heat of fusion J/g | Partial heat of fusion °C. | Ratio of partial heat of fusion % | Amount added Parts by mass | Type | Amount added Parts by mass | Molten resin temperature[*1] °C. | Temperature difference[*2] °C. |
| Ex. 1 | 44.1 | 14.7 | 33 | 100 | butane | 11.0 | 117 | −16.7 |
| Ex. 2 | 44.1 | 14.7 | 33 | 100 | butane | 11.0 | 117 | −16.7 |
| Ex. 3 | 44.1 | 14.7 | 33 | 100 | butane | 17.6 | 117 | −16.7 |
| Ex. 4 | 44.1 | 14.7 | 33 | 45 | butane | 11.0 | 117 | −16.7 |
| Ex. 5 | 44.1 | 14.7 | 33 | 100 | butane | 11.0 | 120 | −13.7 |
| Ex. 6 | 44.1 | 14.7 | 33 | 100 | butane | 11.0 | 117 | −16.7 |
| Ex. 7 | 40.4 | 12.2 | 30 | 100 | butane | 11.0 | 117 | −16.3 |
| Ex. 8 | 44.1 | 14.7 | 33 | 100 | butane | 11.0 | 117 | −16.7 |
| Ex. 9 | 44.1 | 14.7 | 33 | 100 | butane | 11.0 | 117 | −16.7 |
| Ex. 10 | 44.1 | 14.7 | 33 | 100 | butane | 11.0 | 140 | 6.3 |
| Comp. Ex. 1 | 34.9 | 16.9 | 48 | 100 | butane | 11.0 | 120 | −11.4 |
| Comp. Ex. 2 | 34.9 | 16.9 | 48 | 100 | butane | 11.0 | 117 | −14.4 |
| Comp. Ex. 3 | 35.4 | 18.0 | 51 | 100 | butane | 11.0 | 117 | −17.8 |
| Comp. Ex. 4 | 40.4 | 12.2 | 30 | 100 | butane | 11.0 | 112 | −21.3 |
| Comp. Ex. 5 | 44.1 | 14.7 | 33 | 25 | butane | 11.0 | 117 | −16.7 |

[*1]The temperature of antistatic layer-forming molten resin.
[*2]Temperature difference = [Temperature of antistatic layer-forming molten resin (° C.)] − [Melting point of polymeric antistatic agent (° C.)]

TABLE 2

Foam sheet

| | Apparent density kg/m$^3$ | Thickness mm | Basis weight g/m$^2$ | Basis weight of antistatic layer | | Surface resistivity Ω | Initial electrostatic potential V | Closed cell content % |
|---|---|---|---|---|---|---|---|---|
| | | | | Face layer g/m$^2$ | Back layer g/m$^2$ | Evaluation result | | |
| Ex. 1 | 46 | 1 | 46 | 2.5 | 2.5 | $1.0 \times 10^9$ | 0 | 47 |
| Ex. 2 | 46 | 2 | 92 | 5.0 | 5.0 | $2.5 \times 10^9$ | 0 | 51 |
| Ex. 3 | 31 | 1 | 31 | 2.5 | 2.5 | $1.4 \times 10^9$ | 0 | 49 |
| Ex. 4 | 46 | 1 | 46 | 5.0 | 5.0 | $2.3 \times 10^9$ | 0 | 35 |
| Ex. 5 | 46 | 1 | 46 | 2.5 | 2.5 | $1.0 \times 10^9$ | 0 | 27 |
| Ex. 6 | 46 | 1 | 46 | 2.5 | 2.5 | $4.3 \times 10^9$ | 23 | 49 |
| Ex. 7 | 46 | 1 | 46 | 2.5 | 2.5 | $4.6 \times 10^9$ | 0 | 47 |
| Ex. 8 | 46 | 1 | 46 | 2.5 | 2.5 | $2.9 \times 10^9$ | 3 | 51 |
| Ex. 9 | 46 | 1 | 46 | 2.5 | 2.5 | $2.5 \times 10^9$ | 0 | 49 |
| Ex. 10 | 46 | 1 | 46 | 2.5 | 2.5 | $1.0 \times 10^9$ | 0 | 0 |
| Comp. Ex. 1 | 46 | 1 | 46 | 2.5 | 2.5 | $3.8 \times 10^{10}$ | 500 | 29 |
| Comp. Ex. 2 | 46 | 1 | 46 | 2.5 | 2.5 | $1.7 \times 10^{11}$ | 1200 | 27 |
| Comp. Ex. 3 | 46 | 1 | 46 | 2.5 | 2.5 | $1.1 \times 10^{14}$ | 2400 | 30 |
| Comp. Ex. 4 | 46 | 1 | 46 | 2.5 | 2.5 | $1.3 \times 10^{11}$ | 1300 | 52 |
| Comp. Ex. 5 | 46 | 1 | 46 | 2.5 | 2.5 | $3.7 \times 10^{10}$ | 580 | 47 |

DESCRIPTION OF REFERENCE NUMERALS

1: polyethylene-based resin foam sheet
2: polyethylene-based resin foam layer
3: antistatic layer
4: polyethylene-based resin
5: polymeric antistatic agent
6: volatile plasticizer
7: antistatic layer-forming molten resin
8: polyethylene-based resin
9: physical blowing agent
10: foam layer-forming molten resin
11: first extruder
12: second extruder
13: circular die

The invention claimed is:
1. A polyethylene-based resin foam sheet with an apparent density of 15 to 150 kg/m$^3$, comprising a foam layer which contains, as a base resin, a polyethylene-based resin containing a low-density polyethylene, and an antistatic layer which is lamination bonded to at least one side of the foam layer and contains a polymeric antistatic agent and, as a base resin, a polyethylene-based resin containing a low-density polyethylene, wherein the polymeric antistatic agent has a melting point of 125 to 140° C. and a ratio of its partial heat of fusion in a region above the melting point to its total heat of fusion of 40% or lower, the antistatic layer contains the polymeric antistatic agent in an amount of 45 to 300 parts by mass based on 100 parts by mass of the polyethylene-based resin constituting the antistatic layer, the antistatic layer has a basis weight of 1 to 50 g/m$^2$, the antistatic layer shows an initial electrostatic potential of 0 V when a voltage of 10 kV is applied to a surface thereof for 30 seconds, and the initial electrostatic potential results from a conductive network formed in the antistatic layer via coextruding the antistatic layer together with the foam layer such that an antistatic layer-forming molten resin is supplied at a temperature in a range that is equal to or higher than the melting point of the polymeric antistatic agent −17.0° C. into a coextrusion die and coextruded together with the foam layer.

2. The polyethylene-based resin foam sheet according to claim 1, wherein the antistatic layer has a basis weight of 1 to 10 g/m$^2$.

3. The polyethylene-based resin foam sheet according to claim 1, wherein the polymeric antistatic agent has a melt viscosity $\eta_{AS}$ at 190° C. and a shear rate of 100 sec$^{-1}$ of 100 to 600 Pa·s, and wherein a ratio $\eta_{AS}/\eta_{PE}$ of the melt viscosity $\eta_{AS}$ to a melt viscosity $\eta_{PE}$ at 190° C. and a shear rate of 100 sec$^{-1}$ of the polyethylene-based resin constituting the antistatic layer is 0.4 to 1.0.

4. The polyethylene-based resin foam sheet according to claim 1, wherein the polyethylene-based resin constituting the antistatic layer has a melt viscosity $\eta_{PE}$ at 190° C. and a shear rate of 100 sec$^{-1}$ of 800 to 2,000 Pa·s.

* * * * *